(12) United States Patent
Somarowthu et al.

(10) Patent No.: US 12,342,809 B2
(45) Date of Patent: Jul. 1, 2025

(54) AGRICULTURAL DISTRIBUTION VEHICLE AND METHOD OF USE THEREOF

(71) Applicant: DEERE & COMPANY, Moline, IL (US)

(72) Inventors: Mahesh Somarowthu, Pune (IN); Manu Gupta, Pune (IN); Prashant Kumar, Pune (IN); Pradeep Lokare, Pune (IN); Wilhelmus Peeters, Horst (NL)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/591,496

(22) Filed: Feb. 29, 2024

(65) Prior Publication Data
US 2024/0292827 A1    Sep. 5, 2024

(30) Foreign Application Priority Data
Mar. 2, 2023    (DE) .................. 102023105198.9

(51) Int. Cl.
| | | |
|---|---|---|
| *A01M 7/00* | (2006.01) | |
| *B64U 80/86* | (2023.01) | |
| *B64U 101/40* | (2023.01) | |
| *B64U 101/60* | (2023.01) | |

(52) U.S. Cl.
CPC ............ *A01M 7/0092* (2013.01); *A01M 7/00* (2013.01); *A01M 7/0042* (2013.01); *B64U 80/86* (2023.01); *B64U 2101/40* (2023.01); *B64U 2101/60* (2023.01)

(58) Field of Classification Search
CPC ... A01M 7/0092; A01M 7/0042; B64U 80/86; B64U 2101/40; B64U 2101/60; B64U 2101/57; B64U 10/60; B64D 37/26; B64D 1/00; B64D 1/16; B64D 1/18; B64D 1/22; B67D 2007/0403; B67D 2210/00136

See application file for complete search history.

(56) References Cited

U.S. PATENT DOCUMENTS

| | | | |
|---|---|---|---|
| 2018/0194466 A1 | 7/2018 | Zhao et al. | |
| 2018/0354624 A1 | 12/2018 | Liu | |
| 2019/0047010 A1* | 2/2019 | Barker | ................... B05B 12/12 |
| 2020/0113166 A1 | 4/2020 | Warren, Jr. et al. | |

(Continued)

FOREIGN PATENT DOCUMENTS

| | | | |
|---|---|---|---|
| DE | 102011055163 A1 | 5/2013 | |
| DE | 102015206844 A1 | 11/2015 | |
| DE | 10247490 A1 | 4/2022 | |

(Continued)

OTHER PUBLICATIONS

RU-2586142-C1 Translation (Year: 2016).*

(Continued)

*Primary Examiner* — Christopher D Hutchens
*Assistant Examiner* — Steven J Shur

(57) ABSTRACT

A method and arrangement for operating an agricultural distribution vehicle with a tank for a liquid to be applied, a boom with spray nozzles attached thereto for distributing the liquid on a surface and a chassis supported on the ground which is movable in a forward direction over the surface. The method includes refilling the contents of the tank via an aerial vehicle.

12 Claims, 3 Drawing Sheets

(56) References Cited

U.S. PATENT DOCUMENTS

2022/0153417 A1* 5/2022 Faers ................. A01M 7/0089
2022/0211026 A1* 7/2022 McCann ................. B64D 1/18

FOREIGN PATENT DOCUMENTS

| | | |
|---|---|---|
| DE | 102020127743 A1 | 4/2022 |
| EP | 2954769 A1 | 12/2015 |
| EP | 3381281 A1 | 10/2018 |
| EP | 3620050 A1 | 3/2020 |
| EP | 3892584 A1 | 10/2021 |
| EP | 3653051 B1 * 8/2024 ......... A01M 7/0057 |
| IT | 201800010413 A1 | 5/2020 |
| RU | 2586142 C1 * | 6/2016 |
| WO | WO 2020126386 A1 | 6/2020 |
| WO | WO 2020090589 A1 | 2/2021 |

OTHER PUBLICATIONS

Extended European Search Report and Written Opinion issued in European Patent Application No. 24154500.3 dated Sep. 24, 2024, in 11 pages.

* cited by examiner

AGRICULTURAL DISTRIBUTION VEHICLE AND METHOD OF USE THEREOF

CROSS-REFERENCE TO RELATED APPLICATIONS

This application claims the benefit of German patent application 102023105198.9, filed on Mar. 2, 2023. The entire disclosure of the application referenced above is incorporated by reference.

FIELD

The present disclosure relates to a method and arrangement for operating an agricultural distribution vehicle with a tank for a liquid to be applied, a distributor linkage with attached spray nozzles for distributing the liquid on an area and a chassis supported on the ground, which is movable in a forward direction over the area.

BACKGROUND

Agricultural distribution vehicles, commonly referred to as field sprayers, are used to spread agricultural products on a field. The distribution vehicles can be designed as self-propelled or towed vehicles or can be mounted detachably on a carrier vehicle—e.g., agricultural tractor. Agricultural distribution vehicles often include relatively wide distributor linkages that folds in for transport and where nozzles are distributed across the width of the distributor linkage to deliver the product. The products are usually liquids used to fertilize crops grown in the field or to control diseases or pests or weeds. Either the product should be discharged in predetermined quantities per unit area, which are constant over a field or can vary site-specifically, or the required application quantities are detected or adjusted on site by sensors that detect, for example, the fertilizer requirements of the plants or a possible pest infestation. For this purpose, the nozzles are opened and closed based on a pre-planned application rate map and/or controlled by sensors (see, for example, EP 3 381 281 A1).

The distribution vehicle comprises a tank for the liquid to be applied and usually a tank for a rinsing liquid used to clean the nozzles and/or the fluid lines, valves and pumps of the vehicle after the product has been applied (see EP 3 620 050 A1 or WO 2020/126386 A1). Sometimes the contents of the tank for the rinsing liquid is also used to fill up the tank for the liquid to be applied during an application process, optionally with the addition of a concentrate of the active ingredient of the liquid to be applied.

Especially in the case of sensor-controlled application quantities, advance planning of the quantities of liquid to be carried for a distribution process is problematic, since at the time of filling the distribution vehicle at its location (farm or contractor) it cannot be known exactly what quantities are actually needed. For this purpose, empirical values from previous years or preliminary investigations of the areas to be processed can be used, which, however, are always subject to minor or major errors (for example, DE 102 47 490 A1 or DE 10 2011 055 163 A1). Therefore, situations are conceivable in which the liquids carried in the tank are not sufficient to complete a planned distribution process without refilling the tank. This means that the operator of the distribution vehicle has to drive back to the site and refill the tank, which reduces productivity and results in an unnecessary loss of time. Another possibility would be to fill the tank with a sufficiently large safety margin, which in most cases, however, only leads to the liquids being carried along unnecessarily and having to be disposed of later.

Proposals were made to use unmanned aerial vehicles (so-called drones) in agriculture, e.g., as field sprayers (US 2018/0354624 A1, US 2022/0211026 A1), or to supply agricultural machinery with fuel or oil (DE 10 2020 127 743 A1) or to supply a spray-spreading aerial vehicle (US 2018/0194466 A1), but not to supply a (usual, ground-based) field sprayer with liquids.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The principles of the present disclosure provide a method and an arrangement for operation of a ground-based distribution vehicle, in which the above-mentioned disadvantages are not present or to a lesser extent.

An aerial vehicle carries out a possibly necessary refilling of a tank of a distribution vehicle. This enables a quick refilling process and eliminates the need for a possible return trip to the location of the distribution vehicle if the originally carried amount of liquid to be applied is not sufficient. Unlike a land vehicle, the aerial vehicle does not have to drive on public roads and thus there is no need for a person operating a land vehicle to transport the additional liquid to the distribution vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
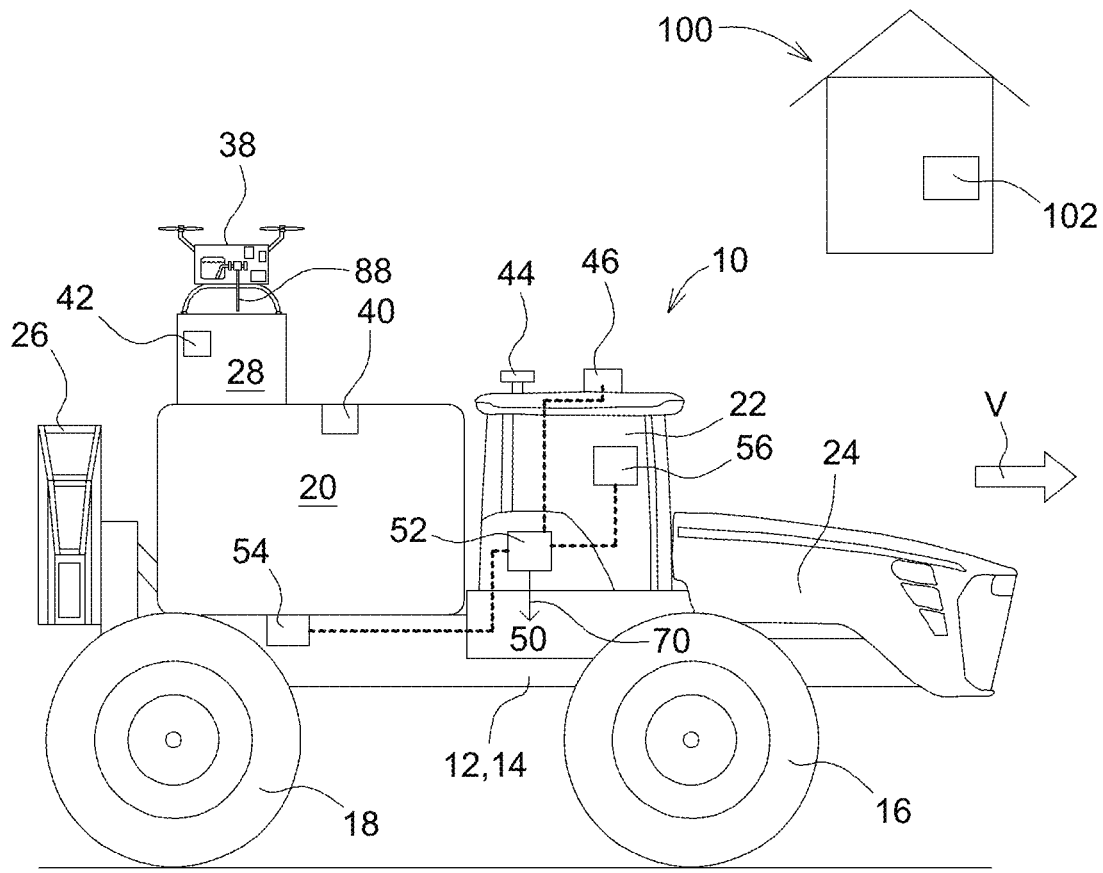
FIG. 1 is a lateral view of a distribution vehicle designed as a self-propelled field sprayer with an aerial vehicle docked thereon for filling the tank for the rinsing liquid according to the principles of the present disclosure.
Figure 2:
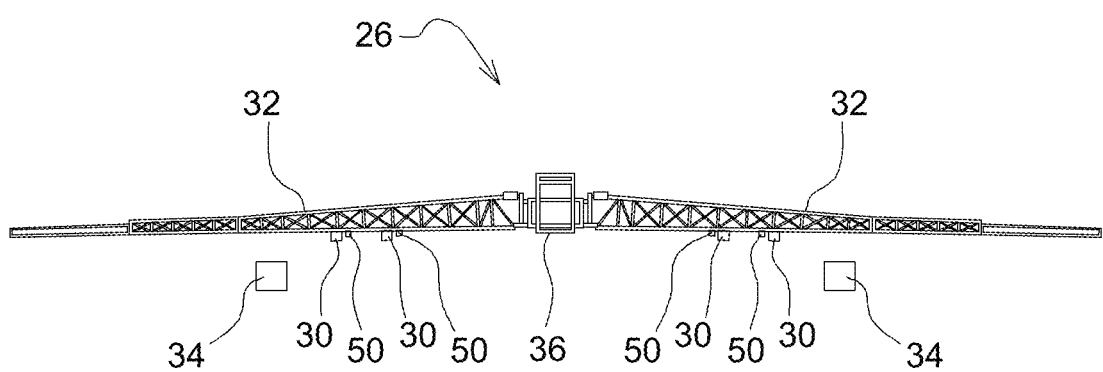
FIG. 2 is a rear view of the extended distribution linkage of the distribution vehicle of FIG. 1.

FIG. 1 shows a distribution vehicle 10 for the application of liquid active ingredients in the form of a self-propelled vehicle. In other implementations, not shown, the distribution vehicle 10 could a device attachable to a farm tractor or towed by it (the distribution vehicle would be in this case the agricultural tractor with the device). The distribution vehicle 10 comprises a chassis 12 with a frame 14 resting on the ground on front wheels 16 and rear wheels 18. The wheels 16, 18 may be steerable and driven. A first tank 20 for receiving a liquid to be applied—for example, an active ingredient dissolved in water, a second tank 28 for receiving a rinsing liquid—for example, water—and a cabin 22 in front of which an engine compartment 24 are supported on the frame 14. Although the usual direction of travel V in operation is directed to the right in FIG. 1, the distribution vehicle 10 can also drive and/or apply spray backwards. At the rear, an inclination and height-adjustable distribution linkage 26 is attached to the frame 14 of the distribution vehicle 10, which is shown in FIG. 2 in a rear view in an unfolded position.

The distributor linkage 26 comprises a middle section 36 and fold-out booms 32. Spray nozzles 30 are distributed along the booms, which serve to spread the liquid from the first tank 20. In addition, sensors 34 distributed over the width of the booms 32, and directed to the field, are provided, which provide a signal to a control device 52, which contains information about the condition of the plants in the field. The sensors 34 can, for example, detect the need of the plants for fertilizers or a possible infestation with pests to be controlled (insects, fungi, wild herbs), whether optically or in any other way. The output signal of the sensors 34 is processed by the control device 52 and, if necessary, control signals are delivered via a bus 70 to actuators 50 of the individual spray nozzles 30 to specifically control the output of the active ingredient from the first tank 20, which is connected via a valve 54 and lines to the spray nozzles 30.

The second tank 28 contains a rinsing liquid—for example, water—and as shown in FIG. 1 an unmanned aerial vehicle 38 is docked to the second tank 28, the function and task of which are described below. The rinsing fluid from the second tank 28 is used after the end of the work to clean the spray nozzles 30 by separating the first tank 20 from the lines leading to the spray nozzles 30 by the valve 54 and connecting the second tank 28 to these lines. For this purpose, the valve 54 is connected to the control device 52, which in turn is connected to an operator interface 56 arranged in the cabin 22, via which the operator can initiate the rinsing process. The second valve 54 may also be configured to introduce the rinsing fluid from the second tank 28 into the first tank 20 to supplement its level as needed, if necessary, upon appropriate input from the operator via the operator interface 56. The operator in this case can make a supplement of the amount of active substance in the first tank 20 by hand.

The tanks 20, 28 are associated with sensors 40, 42 connected to the control device 52 to detect the respective level. The control device 52 is also connected to a receiver 44 for receiving signals from a satellite-based positioning system (GNSS, such as GPS or Galileo). In other implementations, the control device 52 may automatically control the speed and direction of steering of the distribution vehicle 10, based on a stored electronic map of the area onto which spray is to be applied and the signals of the receiver 44. The signals of the receiver 44 can also serve, inter alia, to create an electronic map stored in a memory, in which it is documented at which points of the surface how much material was applied.

Figure 3:
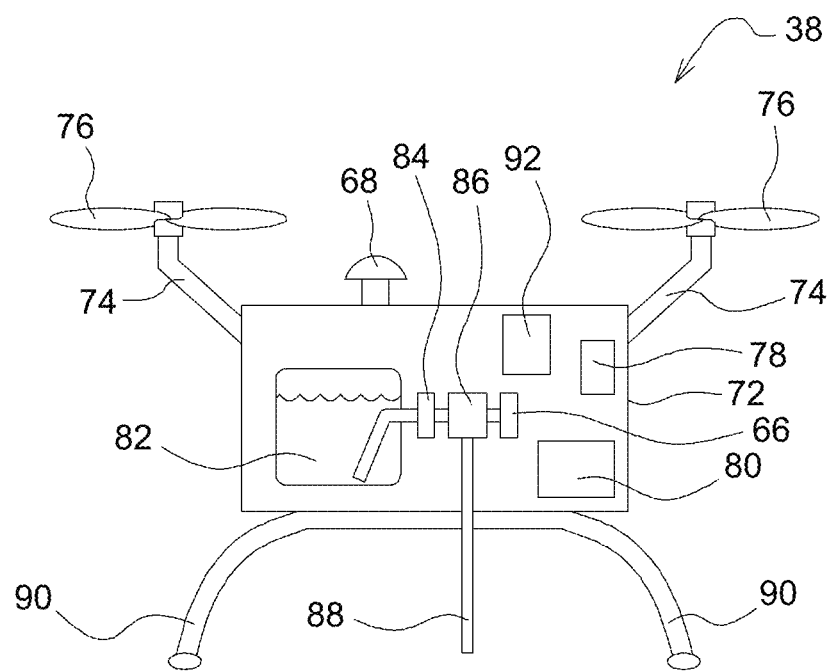
FIG. 3 is an enlarged, schematic view of the aerial vehicle of FIG. 1.

The aerial vehicle 38 is shown in FIG. 3 in an enlarged lateral view compared to FIG. 1. The aerial vehicle 38 comprises a housing 72 at the top of which a number of rotors 76 are attached to brackets 74. The housing 72 has at its bottom some supports 90, with which it can land on the ground. Within the housing 72 a controller 78, an energy source 80—for example, an accumulator—a communication unit 92 and a tank 82 are arranged. The tank 82 is connected via a valve 84 to a conduit 88 extending downwards below the housing 72. In one implementation, the conduit 88 is retractable into the housing 72 and may consist of flexible material and be wound on a coiler 86 that can be driven by a drive 66. FIG. 3 shows the conduit 88 in the extended state. In another implementation, not shown, the conduit 88 may be constructed from telescopic sections which are movable relative to each other by the drive 66.

The communication unit 92 may be connected to a similar communication unit 46 of the distribution vehicle 10 directly or via one or more arbitrary relay stations, using any protocol, such as for mobile telephony or internet communication. The control 78 may thus communicate with the control device 52 of the distribution vehicle 10 so that they can exchange information with each other in both directions. Alternatively, both may communicate separately with a server 102 located at a remote station 100. The server 102 can thus be outsourced, for example, to the cloud. The controller 78 may also control the rotors 76—i.e., it serves as flight control—and is connected to a receiver 68 for receiving signals from a satellite-based positioning system (GNSS, such as GPS or Galileo), possibly including a fixed or mobile correction system (RTK), and it controls the valve 84 and optionally, the drive 66 for retracting and retracting the conduit 88.

Figure 4:
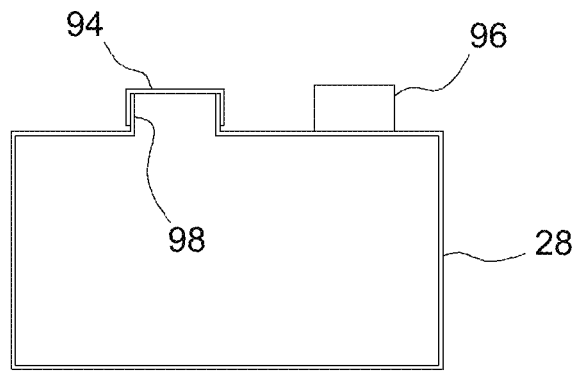
FIG. 4 is a lateral view of a top of a second tank of the distribution vehicle with a first example openable lid.
Figure 5:
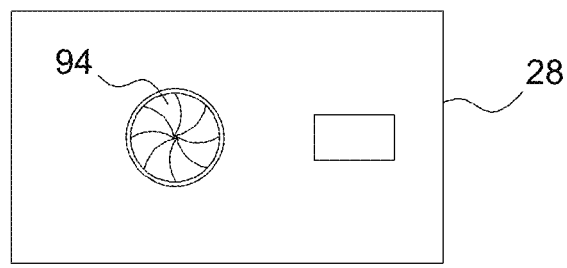
FIG. 5 is a top view of the second tank of the distribution vehicle with a second example openable lid.

The aerial vehicle 38 can, as shown in FIG. 1, land on the second tank 28 of the distribution vehicle 10. An opening 98 at the top of the second tank 28 is closable by a lid 94, which is movable by an actuator 96 connected in a signal-transmitting manner to the control device 52 between a closed position (shown in FIG. 4) and an open position (not shown). The lid 94 may, as shown in FIG. 4, be movable as a whole by the actuator 96, or it is, as in the implementation shown in FIG. 5, designed as an iris diaphragm in the manner of a camera leaf shutter or a lens. As a result, there is the possibility that the aerial vehicle 38 lands on the second tank 28, the actuator 96 opens the lid 94 and the drive 66 extends the conduit 88, so that it extends through the opening 98 into the second tank 28 and the valve 84 is opened to transfer a rinsing liquid from the tank 82 of the aerial vehicle 38 into the second tank 28.

The arrangement shown is suited to transport and transfer harmless rinsing fluids, like water. If the aerial vehicle 38 shall alternatively or additionally transport an active ingredient (pesticide or similar) it is possible to transport a closed container with the ingredient that is removed by the operator of the distribution vehicle 10 from the aerial vehicle 38 and the contents of which is filled into tank 20 in a manner as used presently. For this purpose, one could use a so-called closed transfer system (cf. EP 3 892 584 A1) in which an undesired expelling of the ingredient is excluded. It would also be possible to automate such a system, i.e., the steps that are actually performed manually would be performed by actuators of the aerial vehicle 38 and/or the distribution vehicle 10, in order to transfer the ingredient fully automatically by a closed transfer system from the aerial vehicle 38 into the tank 20 of the distribution vehicle 10.

Figure 6:
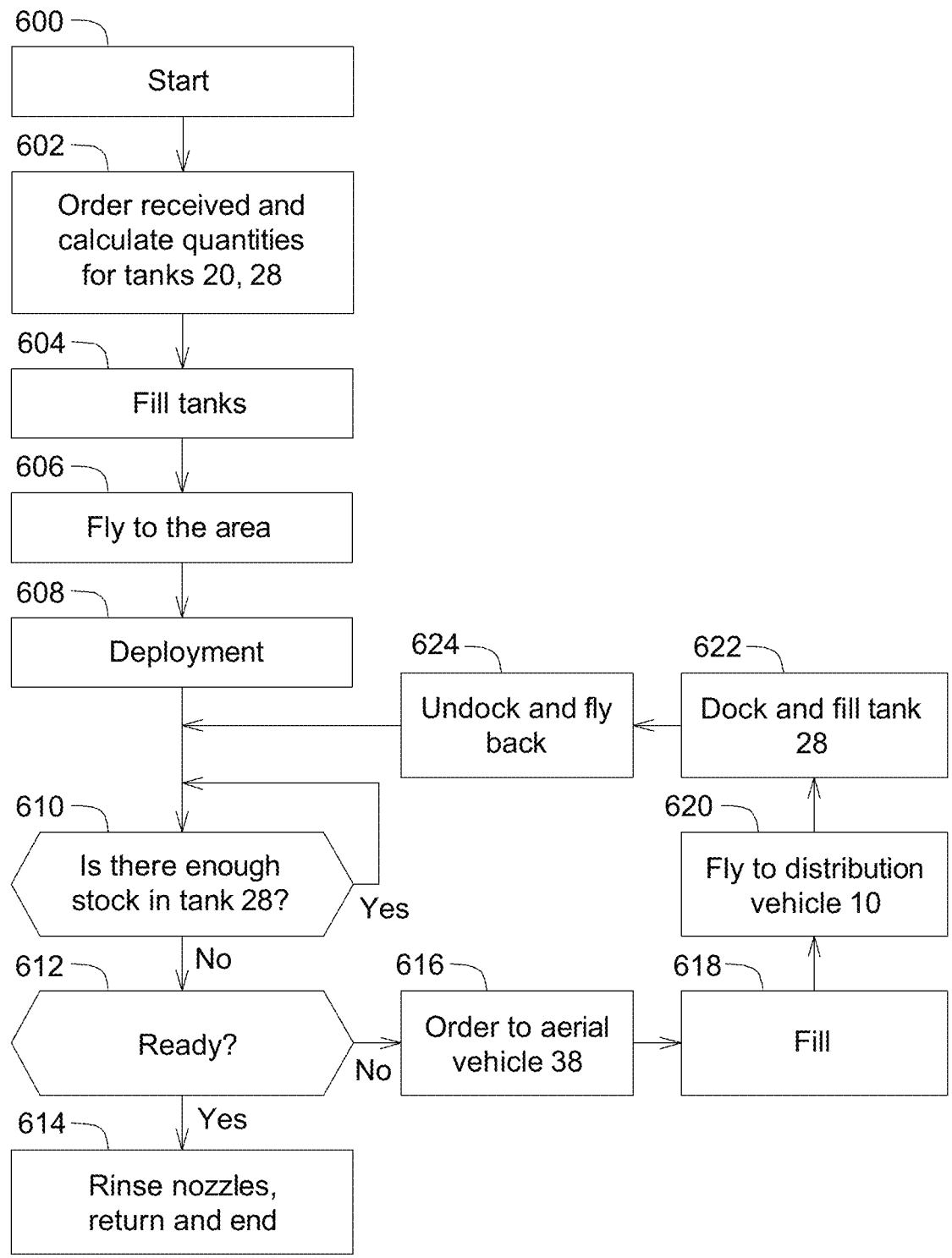
FIG. 6 is a flowchart depicting an example operation of the distribution vehicle and the aerial vehicle.

FIG. 6 shows a possible procedure for the operation of the distribution vehicle 10 and the aerial vehicles 38.

After starting at step 600, in which the control device 52, the controller 72 and the server 102 by exchanging suitable identification data and optionally other parameters, such as tank volumes, current positions, type of active ingredient, etc. can mutually authenticate (further authentications can also be carried out later at steps 602, 616 and 622), at 602 the control device 52 of the distribution vehicles 10 receives an order from the server 102.

A farmer or a person commissioned by him is thus able to specify an order on the server 102 that the distribution vehicle 10 is to perform. This order contains information on the location of an area (field) to be exposed to an active ingredient by the distribution vehicle 10, the active ingredient and, if applicable, the quantities. In server 102, any further details on the intended procedure may be stored, in particular historical data on past processing of the area, soil properties, results of explorations, etc. In addition, data regarding technical conditions and parameters of the distribution vehicles 10 may be stored in the server 102.

The exact planning of the procedure to be carried out in the processing of the order, such as routes to be taken on the road and in the field, required quantities of active ingredient and rinsing liquid, etc., can be carried out by the server 102 or the control device 52 of the distribution vehicles 10, or at least the quantities are already specified by the farmer when the order is placed. The control device 52 has therefore after step 602 sufficient information available to process the order. Among other things, information is available to the control device 52 on how much active ingredient and water is to be filled into the first tank 20 and how much rinsing liquid into the second tank 28. If the sensors 34 are to be used in the execution of the order, i.e., the exact application quantities are determined only on the field, the planning device (server 102 or control device 52) uses amounts based on empirical values that contain a sufficient safety margin so that the tanks 20, 28 are not empty during the order.

This is followed by step 604, in which the tanks of the distribution vehicles 10 are filled, using the quantities determined or specified at step 602. At step 606, the operator drives the distribution vehicle 10 to the area to be loaded, and at step 608, the application process is carried out, taking into account the information obtained at step 602. Here, the sensors 34 can be used to determine the respective application rates. If necessary, rinsing liquid from the second tank 28 can be transferred to the first tank 20 as described above.

Step 610 checks whether the amount of rinsing fluid in the second tank 28 is likely to be sufficient to carry out the entire job. Here, the current level of the first and second tank 20, 28 can be taken into account by means of sensors 40, 42 and the quantities applied so far in the processing of the order and extrapolated to the remaining area, and it is taken into account how much rinsing liquid is required for the final rinsing of the spray nozzles 30 at step 614. If the quantity is expected to be sufficient, step 610 follows again; otherwise step 612 is carried out, in which it is queried whether the order has been completed. If this is the case, step 614 follows, in which the spray nozzles 30 are rinsed with the rinsing liquid from the second tank 28, the return journey to the place of origin is carried out and the order is terminated.

If, on the other hand, it turns out at step 610 that the amount of rinsing liquid in the second tank 28 is insufficient to carry out the entire job, steps 616 to 624 follow (possibly after confirmation by the operator via the operator interface 56). At step 616, the control device 52 of the distribution vehicles 10 sends a corresponding information to the server 102, which forwards it to the control device 72 of the aerial vehicle 38, or directly to the control device 72 of the aerial vehicle 38. This information includes information on the amount of rinsing fluid required and the location of the distribution vehicle 10.

At step 618, the tank 82 of aerial vehicle 38 is filled with the required amount of rinsing liquid. This can be done by a commissioned person who is informed accordingly via a suitable interface (mobile phone, display on aerial vehicle 38 or the like), or automatically by the aerial vehicle 38, for example by the valve 84 being designed as a pump and the rinsing liquid is sucked in autonomously in the required amount through the conduit 88 from a suitable container or similar.

At step 620, the aerial vehicle 38 flies to the distribution vehicle 10. In this case, the position of the distribution vehicle 10 is known to the control device 52 on the basis of the signals of the receiver 44, its specified or planned future path over the area to be processed, optionally its speed specified on the basis of the reaction time of the sensors 34 and associated actuators of the spray nozzles 30 (cf. EP 3 381 281 A1) and thus known procedures for planning the route of a supply vehicle to a moving agricultural vehicle (see, for example, EP 2 954 769 A1) and possible restrictions of the flight path (avoiding inhabited areas, roads, etc.) can be used.

During the flight and possibly already when filling its tank 82, the aerial vehicle 38 can give regular information about its status (position, speed, state of charge of the energy source 80, level of the tank 82, etc.) to the control device 52. This information may be displayed on the operator interface 56 and/or taken into account, if necessary, in the operation of the distribution vehicle 10—for example, if it should take longer than originally expected for the aerial vehicle 38 to arrive at the distribution vehicle 10.

Once the communication between the aerial vehicle 38 and the distribution vehicle 10 via the server 102 has taken place, it can be switched to a direct communication between the control unit 52 and the controller 78 when within a certain distance in order to avoid time delays in the communication from the detour via the server 102. For this purpose, the communication units 92 and 46 can establish a direct connection, for example via a protocol allowing local communication such as WLAN (Wi-Fi) or Bluetooth, Zigbee or the like. Further mutual identification or authentication can also take place here—e.g., via optical features (bar or QR codes) or electronic features such as RFID.

At step 622, landing and docking of the aerial vehicle 38 on the distribution vehicle 10 and filling of the second tank 28 occur. For example, the control device 52 and the controller 72 work together in such a way that the aerial vehicle 38 automatically lands on the second tank 28, the actuator 96 opens the lid 94 and the drive 66 extends the conduit 88, so that the conduit 88 then extends through the opening 98 into the second tank 28 and the valve 84 is opened, to transfer the purge liquid, which is usually clean water, from tank 82 of aerial vehicle 38 to second tank 28. The aerial vehicle 38 can also be mechanically locked on the distribution vehicle 10 for the transfer process, as described for example in DE 10 2015 206 844 A1.

This is followed by step 624, in which the control device 52 and the controller 72 cause the drive 66 to retract the conduit 88 and the aerial vehicle 38 flies back to its location, while the actuator 96 closes the lid 94 again after retracting the conduit 88. The process then returns to step 610. Steps 616 to 624 can be carried out with the distribution vehicle 10 still moving—i.e., it does not have to stop to fill the second tank 28.

In the preceding implementations, it was assumed that the aerial vehicle 38 fills the second tank 28 with the rinsing liquid. It would also be conceivable, instead or in addition to, to fill the first tank 20 with water or with an aqueous solution of the active ingredient by the aerial vehicle 38. In the second case, the aerial vehicle 38 may be provided with an additional tank for the aqueous solution of the active ingredient or transport a solid or liquid concentrate of the active ingredient.

If necessary, steps 616 to 624 may be carried out multiple times by aerial vehicle 38 in the execution of the order, and/or several aerial vehicles 38 are used.

The above-described tasks or computing capabilities of the control device 52 of the distribution vehicle 10 can be outsourced in whole or in part to the server 102. In this case, corresponding data, in particular with regard to the fill levels of the tanks 20, 28, would be transmitted at certain intervals electronically via the communication unit 46 to the server 102 and, if necessary, instructions for actuators of the distribution vehicle 10 in other direction. The server 102 would be regarded in this case as (part of) the control device 52 of the distribution vehicle 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

What is claimed is:

1. A method for operating an agricultural distribution vehicle that includes a first tank which contains a liquid, a boom, a plurality of spray nozzles attached to the boom, and a chassis supported on the ground, the method comprising:
   moving the agricultural distribution vehicle in a forward direction over a surface;
   dispensing, via at least one nozzle of the plurality of nozzles, the liquid; and
   refilling the first tank via an aerial vehicle.

2. The method of claim 1, wherein the aerial vehicle includes a second tank, wherein the second tank contains water, a rinsing fluid, or a liquid with an active ingredient, the method further comprising transporting the contents of the second tank to the agricultural distribution vehicle.

3. The method of claim 1, wherein the distribution vehicle includes an electronic control device, the method further comprising:
   detecting a level of the liquid in the first tank;
   determining, by the electronic control device, whether the level of the liquid in the first tank is sufficient; and
   in response to determining that the level of the liquid in the first tank is not sufficient, instructing the aerial vehicle to fly to the distribution vehicle to refill the first tank.

4. The method of claim 3, wherein aerial vehicle includes an actuator and the first tank includes an upper opening and a lid that covers the upper opening, the method further comprises opening, by the actuator, the lid prior to refilling the first tank.

5. The method of claim 4, wherein the aerial vehicle includes a conduit connected to the second tank via a valve, the method further comprising: landing the aerial vehicle on the first tank; extending the conduit through the upper opening; and opening the valve to transfer the contents of the second tank to the first tank via the conduit.

6. The method of claim 3, wherein the distribution vehicle includes a sensor, the method further comprising: detecting, by the sensor, a demand associated with an area to be applied with the liquid; generating a signal based on the detected demand; and commanding, by the electronic control device, one or more nozzles of the plurality of spray nozzles based on the generated signal.

7. The method of claim 3, further comprising:
   receiving an order; and
   calculating, by the electronic control device, an amount of liquid associated with the order.

8. The method of claim 7, wherein the liquid in the first tank is the rinsing fluid and the agricultural distribution vehicle includes a third tank that contains the liquid with an active ingredient, the method further comprising:
   transferring at least a portion of the contents of the first tank to the third tank; and
   refilling the first tank via the aerial vehicle in response to receiving the order.

9. The method of claim 3, wherein the aerial vehicle includes a control unit, the method further comprising communicating, by the electronic control device, directly with the control unit of the aerial vehicle.

10. An agricultural system comprising: a distribution vehicle that includes: a first tank configured to hold a first liquid, a first electronic controller configured to detect a level of the first liquid in the first tank, a boom, and a plurality of nozzles mounted on the boom; and an aerial vehicle that includes: a second tank configured to hold a second liquid, at least one rotor, a second electronic controller configured to control the at least one rotor, wherein the first electronic controller is configured to (i) communicate with the second electronic controller and (ii) control the movement of the aerial vehicle based on the detected level of the first liquid in the first tank.

11. The agricultural system of claim 10, wherein:
   the first tank includes an upper opening,
   the aerial vehicle includes a conduit that is (i) fluidly connected to the second tank via a valve and (ii) configured to extend through the upper opening of the first tank, and
   the second electronic controller is configured to actuate the valve.

12. The agricultural system of claim 11, wherein the first electronic controller is: configured to receive an order, calculate an amount of liquid associated with the order, and control movement of the aerial vehicle based on the detected level of the first liquid in the first tank and the calculated amount of liquid associated with the order.

* * * * *